(12) United States Patent
Schmitz

(10) Patent No.: US 8,366,189 B2
(45) Date of Patent: Feb. 5, 2013

(54) COUPLING/UNCOUPLING DEVICE FOR A TRANSMISSION MEANS IN PARTICULAR ON A VEHICLE SEAT WITH A CRASH-ACTIVE HEADREST AND VEHICLE SEAT

(75) Inventor: Andreas Schmitz, Burscheid (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 12/639,285

(22) Filed: Dec. 16, 2009

(65) Prior Publication Data

US 2011/0140486 A1   Jun. 16, 2011

(51) Int. Cl.
*B60N 2/42* (2006.01)
(52) U.S. Cl. ............ 297/216.12; 403/143; 403/144; 403/319; 403/328; 403/122
(58) Field of Classification Search .......... 297/216.12; 403/143, 144, 319, 328, 122, 326
See application file for complete search history.

(56) References Cited

U.S. PATENT DOCUMENTS

| | | | | |
|---|---|---|---|---|
| 2,166,208 A | * | 7/1939 | Dayton | 280/513 |
| 2,256,763 A | * | 9/1941 | Reed | 248/484 |
| 3,276,798 A | | 10/1966 | Merriman | |
| 4,114,922 A | * | 9/1978 | Holbrook | 280/512 |
| 4,225,261 A | | 9/1980 | Marx | |
| 4,527,925 A | * | 7/1985 | Bauer et al. | 403/143 |
| 4,640,142 A | * | 2/1987 | Cummins et al. | 74/502.1 |
| 4,817,979 A | * | 4/1989 | Goettker | 280/512 |
| 5,882,071 A | * | 3/1999 | Fohl | 297/216.12 |
| 6,422,779 B1 | * | 7/2002 | Spagnuolo | 403/138 |
| 6,505,849 B1 | * | 1/2003 | Ebey | 280/513 |
| 6,588,790 B2 | * | 7/2003 | Hall | 280/513 |
| 6,802,275 B2 | | 10/2004 | Schmidt | |
| 6,860,670 B2 | * | 3/2005 | Jeffries | 403/122 |
| 6,923,592 B2 | * | 8/2005 | Crandall | 403/127 |
| 7,226,233 B2 | * | 6/2007 | SuBenbach et al. | 403/143 |
| 7,722,073 B2 | * | 5/2010 | Goettker | 280/513 |
| 2001/0040396 A1 | * | 11/2001 | Kreuels et al. | 297/216.12 |
| 2009/0315370 A1 | * | 12/2009 | Hartlaub | 297/216.12 |

FOREIGN PATENT DOCUMENTS

| | | |
|---|---|---|
| DE | 1931732 | 1/1970 |
| DE | 8425960 | 1/1985 |
| DE | 10054826 | 5/2002 |
| DE | 202004019232 | 2/2005 |
| DE | 102004048910 | 4/2006 |
| DE | 102005009930 | 9/2006 |

(Continued)

OTHER PUBLICATIONS

International Search Report for application No. PCT/EP2008/004740 mailed Jun. 12, 2008.

(Continued)

*Primary Examiner* — Laurie Cranmer
(74) *Attorney, Agent, or Firm* — Fletcher Yoder P.C.

(57) ABSTRACT

A coupling/uncoupling device is disclosed for joining and disjoining first and second segments of a transmission and/or connection means. An end fitting of the device is arranged on the first segment. The end fitting creates a snap connection with a receiver part arranged on the second segment. The device may be adapted for use in vehicles, such as for a vehicle seat, a tailgate, an engine cover, a storage compartment, a battery pole connection, or for securing transported or loaded items.

23 Claims, 9 Drawing Sheets

| | FOREIGN PATENT DOCUMENTS | |
|---|---|---|
| DE | 102006001143 | 4/2007 |
| DE | 102006019176 | 10/2007 |
| DE | 102007006835 | 8/2008 |
| GB | 2082245 A | 3/1982 |
| GB | 2417756 A | 8/2006 |
| WO | 2005097545 | 10/2005 |

OTHER PUBLICATIONS

U.S. Appl. No. 12/664,929, filed Dec. 16, 2009, Andreas Schmitz.

* cited by examiner

COUPLING/UNCOUPLING DEVICE FOR A TRANSMISSION MEANS IN PARTICULAR ON A VEHICLE SEAT WITH A CRASH-ACTIVE HEADREST AND VEHICLE SEAT

BACKGROUND

The invention relates to a coupling/uncoupling device for a transmission means and/or connection means, in particular the Bowden cable of a vehicle seat with a crash-active headrest and a correspondingly equipped motor vehicle seat. The present invention further relates to a method for connecting and disconnecting two segments of a transmission means and/or connection means.

In the still unpublished German patent application DE 10 2006 019 176.5-16, a coupling device for a backrest with a crash-active headrest is disclosed which, in the event of an accident (rear impact), is partially displaced toward the head of the passenger by means of an activation means acted upon by the passenger. For the basic construction and function of such headrests, reference is made to the publication WO 2005/097545 A2. Both patent applications are thus used as references and are thus considered as part of the disclosure of the present invention. The coupling device connects in an unreleasable manner or a reversibly releasable manner a first segment of a transmission means, in particular a Bowden cable, to a second segment of this transmission means and after the coupling causes tension to be transmitted from the actuating means arranged in the lower backrest part to the drive device located in the headrest. The German utility models G 84 25 960.4 and DE 20 2004 019 232 as well as the unexamined German applications DE 10 2005 009 930 and DE 100 54 826 are further prior art known to the applicant. All coupling devices disclosed in the prior art are either of relatively complicated construction and/or the coupling of the two segments is unsuitable for a crash-active headrest.

It was, therefore, the object of the invention to provide a coupling/uncoupling device, which does not have the drawbacks of the prior art.

SUMMARY

The object is achieved by a coupling and/or uncoupling device for a first and a second segment of a transmission means and/or connection means, an end fitting being arranged on the first segment, said end fitting creating a snap connection with a receiver part arranged on the second segment.

The coupling and/or uncoupling device according to the invention is of very simple construction and the connection between the two segments may be produced very easily.

By the coupling and/or uncoupling device according to the invention a first and a second segment of a transmission means and/or connection means are connected to one another. This transmission means and/or connection means is a means by which two parts may be connected to one another and/or by which forces, in particular tensile forces, but also bending moments and/or torques may be transmitted. Preferably, the transmission means is the core of a Bowden cable and accordingly the first and second segments are parts of this core. However, it may also be two parts of a closure or a lock, for example, and accordingly the first and second segments may be two parts of a closure or a lock, which are to be connected to one another.

According to the invention, an end fitting is arranged on one segment, the first segment. An end fitting in the sense of the invention is, in particular, a thickened portion, which particularly preferably is rotationally symmetrical relative to a rotational axis. Quite particularly preferably, the end fitting is spherical.

Furthermore according to the invention the coupling and/or uncoupling device comprises a receiver part which is arranged on the other segment, the second segment, and/or cooperates therewith. This receiver part is preferably designed such that it may entirely receive the end fitting. According to the invention, the end fitting and the receiver part create a snap connection. A snap connection in the sense of the invention is a connection in which a part moved from an original position automatically springs back at least partially in the direction of the original position, and, as a result, the connection is made, in particular between the end fitting and the receiver part.

Preferably, the receiver part comprises an opening, the cross section thereof being able to be altered in a reversible manner. Preferably, the reversible alteration of the cross section is carried out by the end fitting. The end fitting preferably enlarges the opening before the creation of the snap connection, the increase thus being made reversible at least partially during the creation of the snap connection. In a further preferred embodiment, in particular when the end fitting is located in the receiver part, the cross section of the opening is enlarged manually or in a motorized manner, so that the end fitting may be removed from the opening. Subsequently, the end fitting springs back into its original position.

A further subject of the present invention is a coupling and/or uncoupling device for a first and a second segment of a transmission means and/or connection means, an end fitting being arranged on the first segment and a receiver part for the end fitting being arranged on the second segment and the receiver part comprising an opening, the size thereof being able to be altered in a reversible manner by the end fitting and/or manually or in a motorized manner.

The disclosure made relative to the first subject of the invention applies equally to this subject of the invention.

The following embodiments refer to both subjects of the invention.

Preferably, a means protrudes into the opening, by which the cross section thereof may be altered. The means may, for example, be an extension. Particularly preferably, this means is pretensioned in the direction of the opening, firstly to reduce rattling and secondly to achieve the snap connection i.e. the automatic resetting of the means for reducing the cross section. Quite particularly preferably, the end fitting cooperates with the means in order to enlarge the cross section of the opening, as a result. Before creating the snap connection, the means is displaced by the end fitting, for example, such that it no longer protrudes into the cross section. As a result, the opening of the receiver part is enlarged and said receiver part may receive the end fitting and at least partially create a positive connection therewith. The means may, however, also be driven manually and/or in a motorized manner directly or indirectly. This preferred embodiment is, in particular, required for releasing the connection between the two segments. The means is removed from the cross section of the opening manually or in a motorized manner, so that said opening may be enlarged and the end fitting may be moved through the opening.

Preferably, the cross section of the opening is reduced again after the end fitting has been received in the receiver part or removed therefrom. As a result, the end fitting is prevented, in particular, from inadvertently slipping out of the receiver part. This takes place, for example, by the above described means, which are for example spring-driven, preferably slipping back automatically into the opening, in particular snapping back and again reducing the cross section thereof. The means may, however, also have any other drive.

In a preferred embodiment of the present invention, the transmission means and/or connection means is the core of a Bowden cable. This Bowden cable has a sheath, which is preferably supported on the receiver part.

Preferably, the coupling and/or uncoupling device comprises a means for the subsequent release of the connection between the end fitting and the receiver part.

The coupling and/or uncoupling device according to the invention may be used in all areas where transmission means and/or connection means are present. Preferably, the coupling device, however, is part of a crash-active headrest, such as for example is disclosed in DE 10 2004 048 910.6, in DE 10 2007 006 835.4 and in WO 2005/097545 A2, which are thus used as references and are therefore considered as part of the disclosure.

Preferably, the first segment is arranged on the headrest or the retaining bar thereof and the receiver part is arranged on the backrest of a motor vehicle seat.

The coupling and/or uncoupling device according to the invention is preferably part of a motor vehicle seat. A further subject of the present invention is, therefore, a motor vehicle seat comprising the coupling and/or uncoupling device according to the invention.

Preferably, the coupling and/or uncoupling device according to the invention is part of a motor vehicle seat, a tailgate, an engine cover, a storage compartment. It may be used to connect the vehicle seat to the bodywork or other parts of the vehicle interior. Moreover, the coupling and/or uncoupling device according to the invention may be used as a closure for the tailgate, the hood and/or the cover of a storage compartment, for example a glove compartment. The end fitting is thus arranged on a part, for example the tailgate or hood and the transmission means and/or connection means is arranged on the other part. When closing, the end fitting engages in the transmission means in the transmission means and/or connection means, so that a reversible connection is produced therebetween, which may then be released again by the vehicle occupants.

Moreover, the transmission means and/or connection means may be used for fastening transported items or loaded items in motor vehicles and/or as the battery pole connection.

A further subject of the present invention is a method for connecting two segments of a transmission means, an end fitting being arranged on the first segment and a receiver part being arranged on the second segment and the end fitting being inserted into the receiver part and thus an opening being enlarged which, after the reception of the end fitting in the receiver part (6), is automatically reduced again.

The above disclosure applies equally to the method according to the invention.

A further subject of the present invention is a method for connecting two segments of a transmission means, an end fitting being arranged on the first segment and a receiver part being arranged on the second segment, and an opening of the receiver part being enlarged, the end fitting being removed from the receiver part and after the removal of the end fitting the opening being automatically reduced again.

The above disclosure applies equally to the method according to the invention.

Preferably, the opening is altered by a means. Particularly preferably, this means for enlarging the opening is altered in its position. Particularly preferably, the means for reducing the opening is moved back at least partially into its original position, preferably by means of a spring.

DRAWINGS

Hereinafter, the invention is described with reference to FIGS. 1-10. These explanations are merely provided by way of example and do not limit the general inventive idea. The explanations apply equally to all subjects of the present invention.

DETAILED DESCRIPTION

Figure 1:
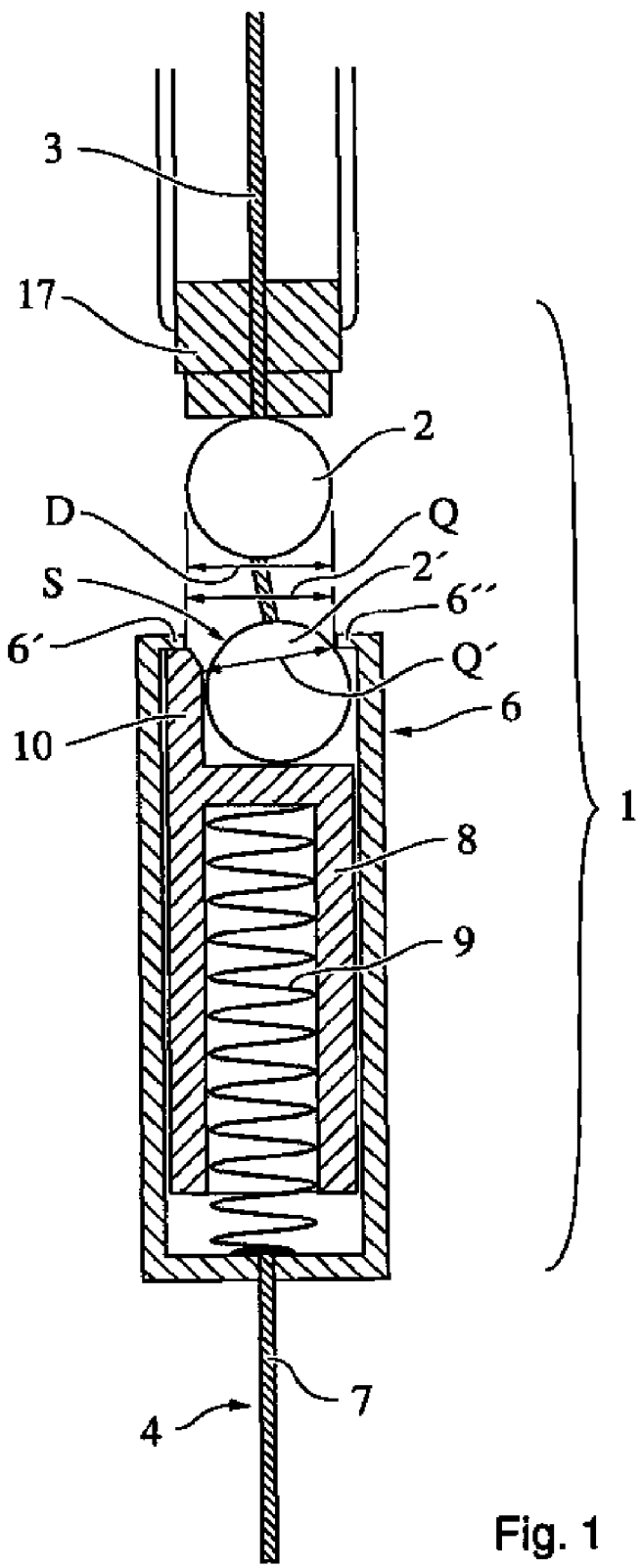
FIG. 1 shows the coupling/uncoupling device according to the invention.

As is visible from FIG. 1, the coupling/uncoupling device 1 comprises an end fitting 2, which is fastened to one end of a first segment of the transmission means, namely the segment 3 of the core 4 of a Bowden cable. The end fitting 2 has a largest dimension D and is preferably configured to be rotationally symmetrical relative to at least one axis. In the embodiment, the end fitting is of spherical configuration, i.e. rotationally symmetrical about a plurality of axes. The end fitting 2 is able to be inserted through a receiver opening 5 into a receiver part 6, which is located at the associated end of the other segment 7 of the core 4. The size of the receiver opening 5 thus corresponds substantially to that of the dimension D of the end fitting 2. In the embodiment, the receiver opening 5 is of spherical design. The receiver part 6 is provided with means which are capable of automatically reducing the free cross section Q of the receiver opening 5, after inserting the end fitting 2, to a free cross section Q' which is smaller than the dimension of the end fitting 2 (in the inserted state denoted by 2'). The end fitting 2' is, as a result, captured in the receiver part 6, so that a positive connection is produced between the segments 3, 7.

The aforementioned means is a piston-like slider 8, which is arranged longitudinally displaceably in the sleeve-shaped receiver part 6, and by means of a spring 9 is pretensioned in the direction of the receiver opening 5 provided in an axial surface of the receiver part 6. The slider 8 has, in turn, on its axial surface facing the receiver opening 5 a tab-like extension 10 extending its peripheral surface. Said extension is associated in its end position with the receiver opening 5 which is capable of reducing the free cross section Q to the free cross section Q'. On its end facing the opening 5, the extension has a chamfer so that the ball 2 is guided in the direction of the cavity in the receiver part. The tab 10 is pressed by the spring 9 against an end stop 6'. The tab 10 has to be able to be lowered in the present example at least by the dimension $X_1$, so that the ball 2 may be inserted through the receiver opening 5. Accordingly, in the lower region at least one path $X_2$ has to be provided, the length thereof at least corresponding to the dimension $X_1$. In the installed state, the end fitting 2 bears against a projection 6" in the receiver part 6.

FIG. 2 shows schematically the creation of the connection between the end fitting 2 and the receiver part 6 in 3 different phases.

Figure 2A:
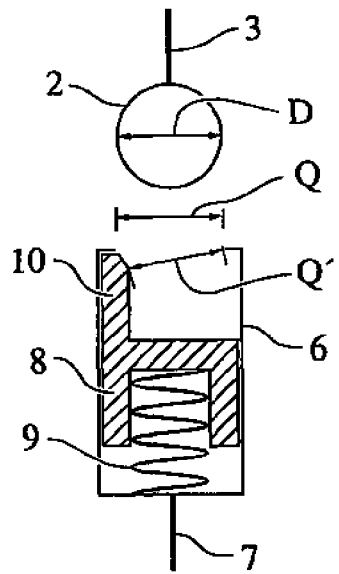
FIGS. 2A-2C show the creation of the connection between the end fitting and the receiver part.

FIG. 2a: initial position. The receiver opening 5 itself has a sufficient free cross section Q for inserting the end fitting 2, which is reduced by the slider 8 located in the upper end position to a free cross section Q'.

Figure 2B:
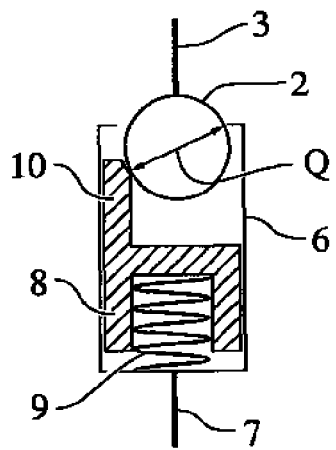

FIG. 2b: during the insertion of the end fitting into the receiver part 6, the slider 8 is displaced counter to the force of the spring 9 in the receiver part 6 and allows the insertion of the end fitting 2 as far as the interior of the receiver part 6.

Figure 2C:
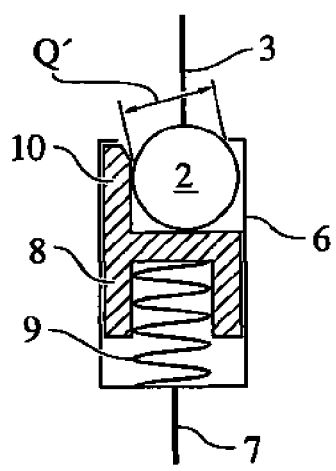

FIG. 2c: as soon as the end fitting 2 is sufficiently located in the receiver part, the slider 8 returns i.e. snaps back into the initial position and again partially closes the receiver opening 5. The free cross section Q' is smaller than the diameter D of the end fitting 2, whereby said end fitting is captured in the receiver part 6.

By means of this process, the coupling device according to the invention is closed.

The contour of the extension 10 is designed such that tension applied to the captured end fitting 2 only causes small axial forces or no axial force to be applied to the slider 8 in the direction away from the receiver opening 5. An inadvertent opening of the coupling/uncoupling device 1 is thus excluded. In the present embodiment, tension applied to the end fitting even causes a force to be applied to the extension 10 in the direction of the receiver opening 5.

Figure 3:
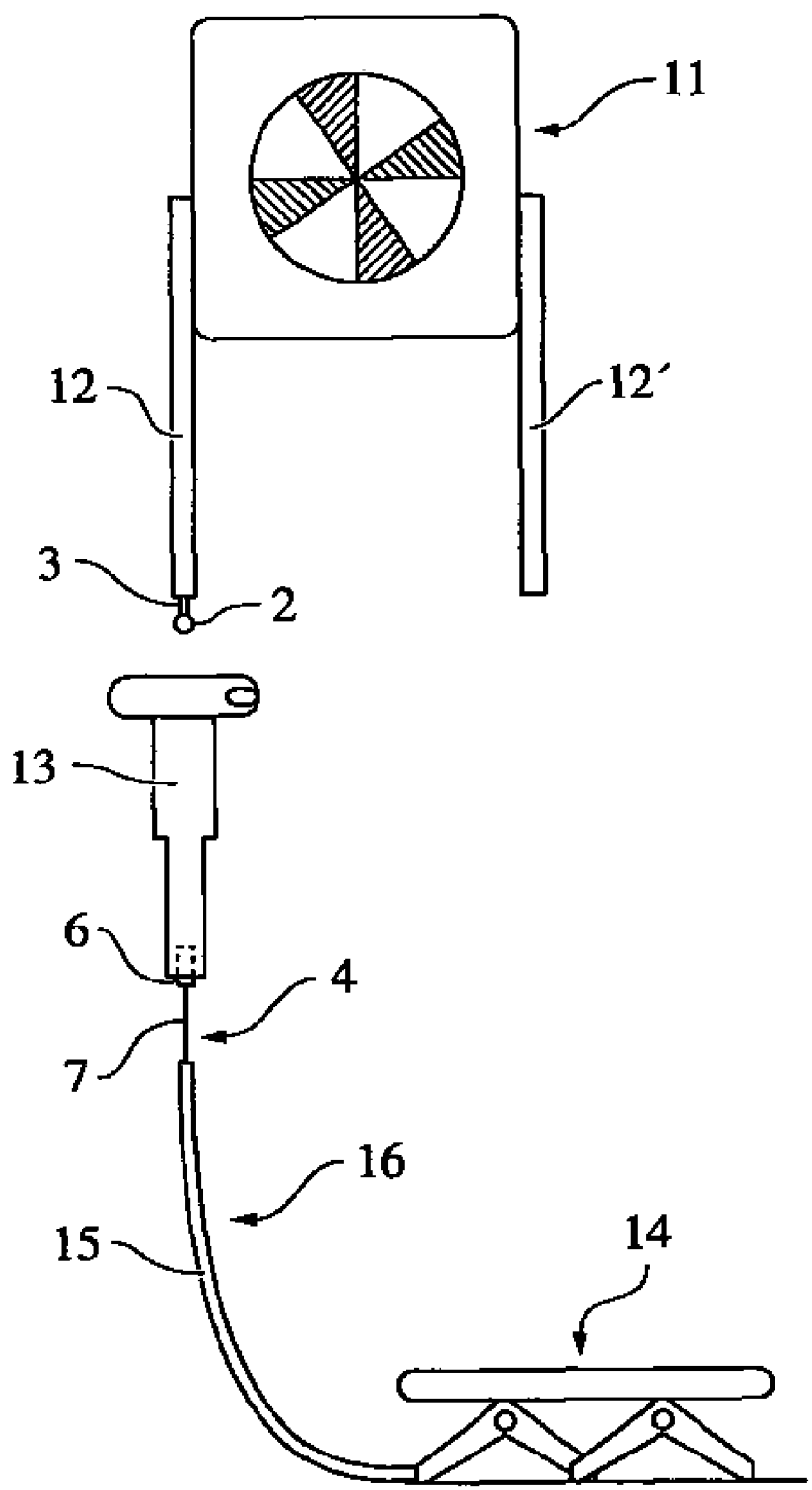
FIG. 3 shows a headrest comprising the coupling/uncoupling device according to the invention.

FIG. 3 shows a specific installed situation of the coupling/uncoupling device according to the invention 1, which in this case is part of a crash-active headrest, as for example is disclosed in WO 2006/037801, which is thus used as a reference and is therefore considered as part of the disclosure. The crash-active headrest 11 is fastened via retaining bars 12, 12' to the backrest of a vehicle seat, not shown. The fastening takes place via headrest sleeves 13 (only shown for retaining bars 12) which, for example, are incorporated in the upper transverse member of the backrest. The retaining bar 12 is thus inserted vertically from above into the headrest sleeve 13 and locked there preferably in a height-adjustable and/or releasable manner. In the lower region of the passenger bearing surface of the backrest, an actuating means 14 is arranged, which is actuated in the event of a rear impact by the inertia of the seat occupant, and thus compressed. For the construction of suitable actuating means, reference is expressly made to the German patent applications DE 10 2004 048 910.6 and DE 10 2007 006 835.4. These patent applications are thus used as references and are therefore considered as part of the disclosure.

The sheath 15 of a Bowden cable 16 is fastened to the actuating means 14 in a shear-resistant manner, which receives the second segment 7 of the core 4 of the Bowden cable 16. The segment 7 is connected with its end remote from the coupling/uncoupling device 1 to the actuating means 14. The receiver part 6, to which the other end of the segment 7 is connected, is inserted from below into the headrest sleeve 13 and releasably clamped there.

The first segment 3 of the core 7 of the Bowden cable 16 is guided from the headrest 11 through the hollow retaining bar 12, the end fitting 2 protruding down from the retaining bar 12. A perforated stopper 17 on the lower end of the retaining bar 12 (see FIG. 1) thus holds the end fitting 2 on the other side of the retaining bar 12.

When inserting the retaining bar 12 into the headrest sleeve 13, the end fitting 2 is anchored without any further assistance (i.e. automatically) in the previously disclosed manner in the receiver part 6. With further insertion of the retaining bar 12, the receiver part 6 is preferably released from the headrest sleeve 13, so that the coupling/uncoupling device 1 is subsequently displaceably arranged in the backrest, and does not hinder a height adjustment of the headrest by displacing the retaining bar 12 in the headrest sleeve 13. It is understood that the clamping forces of the receiver part 6 in the headrest sleeve 13 have to be greater than the displacement forces of the slider 8 in the receiver part 6. A removal of the headrest 11 is, however, no longer possible, as the coupling/uncoupling device 1 has no means for separating the segments 3 and 7 again.

Figure 4A:
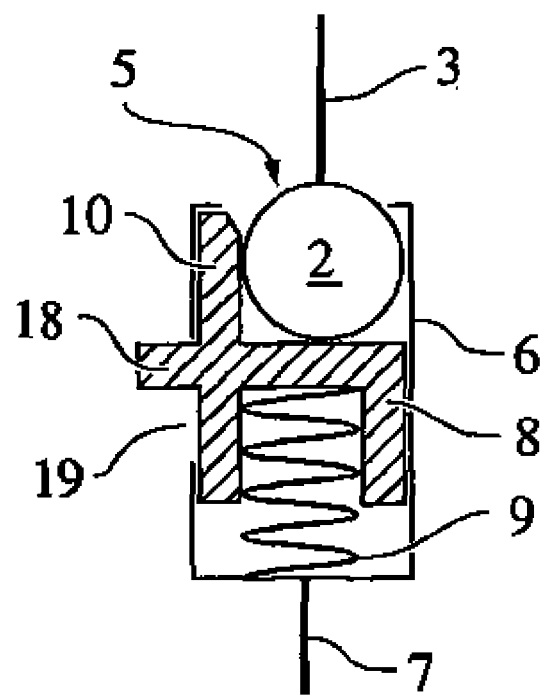
FIGS. 4A, 4B show the release of the connection between the end fitting and the receiver part.

This is, however, possible in the embodiment of the coupling/uncoupling device according to FIG. 4. The slider 8 is preferably provided with at least one projection 18, preferably protruding radially from the receiver part 6, which is guided in a slot 19 extending in the longitudinal direction in the receiver part. When the coupling/uncoupling device 1 is closed, this projection 18 has no function (FIG. 4a).

Figure 4B:
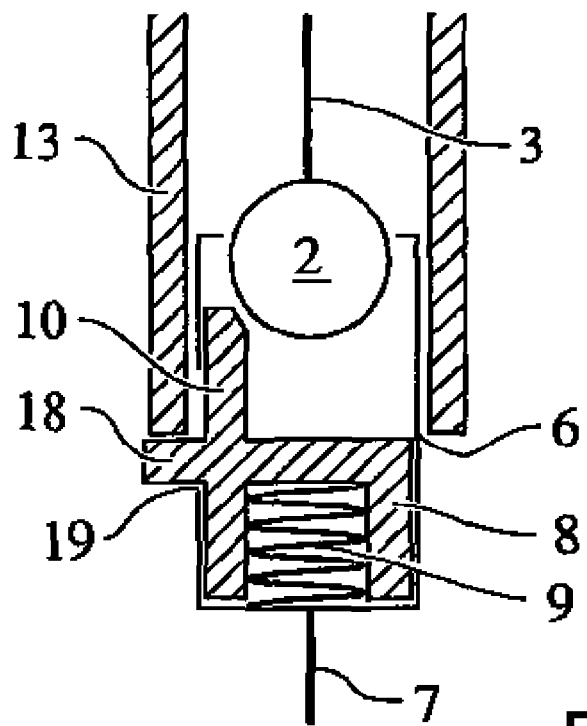

When pulling out the retaining bar 12 from the headrest sleeve 13, however, the projection 18 comes to bear against the lower edge of the headrest sleeve 13 and the means 8, preferably a slider 8, displaces said projection, with further tension applied to the retaining bar away from the receiver opening 5 (FIG. 4b). The end fitting 2 now emerges from the receiver part 6, whilst said end fitting part is again clamped in the headrest sleeve 13 and is ready for further use of the headrest.

Figure 5:
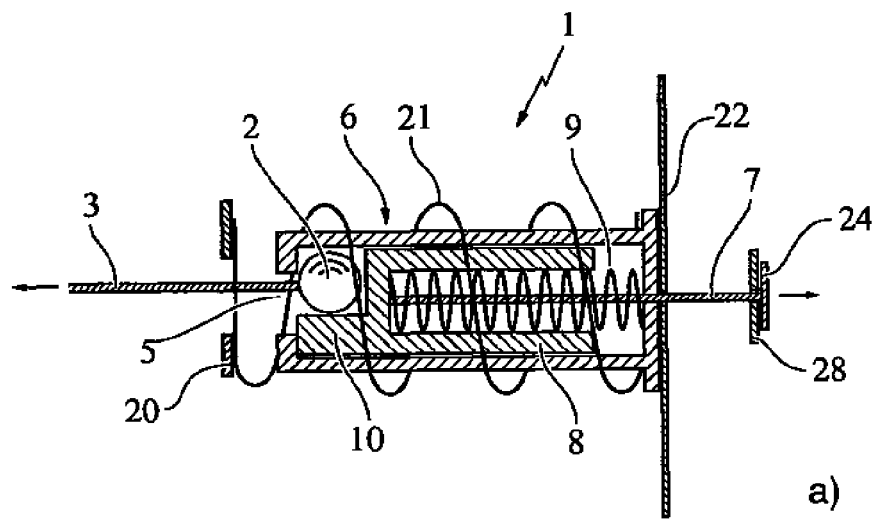
FIGS. 5A, 5B show a further embodiment of the coupling/uncoupling device according to the invention.
Figure 5:
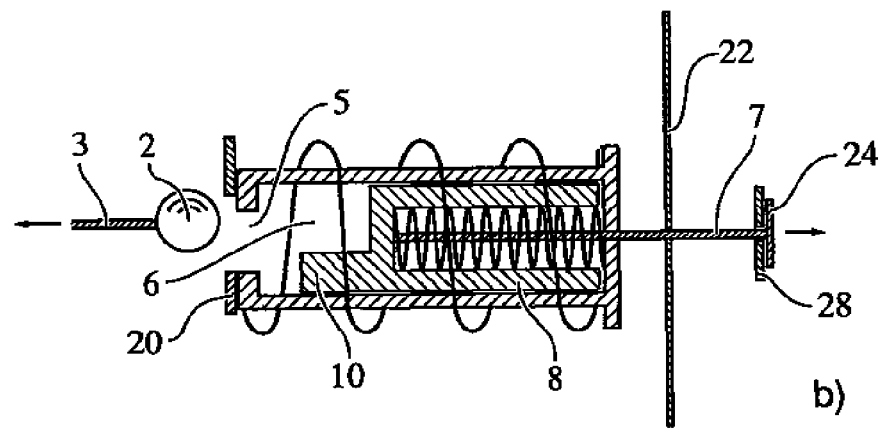

FIG. 5 shows a further embodiment of the coupling and/or uncoupling device according to the invention. The device 1 has a segment 3, in the present case the core of a Bowden cable, with an end fitting 2 which is inserted in FIG. 5a in the receiver part 6, and is held in its position there by the slider 8 which has an extension 10, which reduces the cross section of the receiver opening 5 of the receiver part 6. By means of the spring 9, the slider 8 is pretensioned in the direction of the opening 5. The slider 8 is, moreover, connected to the second segment 7, in the present case also the core of a Bowden cable, which has at its right-hand end a locking pin 24, which is supported on the stationary bearing surface 23 and thus limits the path of the segment 7 to the left. Moreover, the device 1 also has a spring 21, which is supported on its left-hand end on the stationary bearing 20, and cooperates with its right-hand end with a projection on the housing of the receiver part 6 and thus presses the receiver part against the stationary bearing 22. If the segment 3 is now sufficiently pulled, the receiver part moves to the left and both springs 9, 21 are tensioned. The slider 8 remains in its original position by means of the locking pin 14. By the relative motion between the receiver part 6 and the slider 18, the extension 10 connected to the slider is moved out of the receiver opening 5, so that the end fitting 2 may slip out of the receiver opening 5, which is shown in FIG. 5b. As soon as the end fitting 2 has been released from the receiver part 6, the springs 9, 21 force the slider 8 and/or the receiver part 6 into the position shown in FIG. 5a. If the segment 7 is pulled, the slider 8 moves to the right relative to the receiver part 6, whilst the receiver part 6 does not move. As a result, the extension 10 connected to the slider is moved out of the receiver opening 5, so that the end fitting 2 may slip out of the receiver opening 5.

Figure 6:
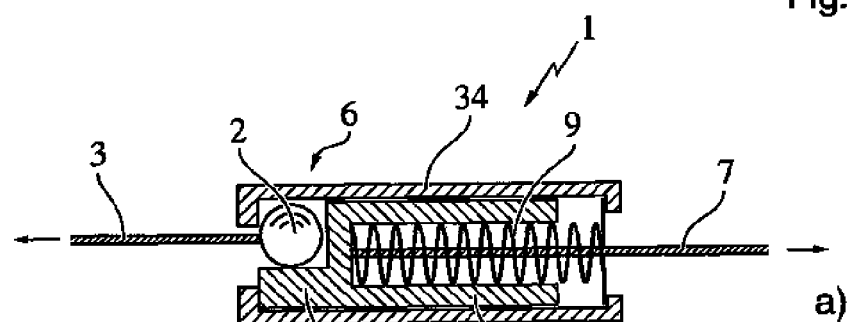
FIGS. 6A, 6B show a further embodiment of the coupling/uncoupling device according to the invention.
Figure 6:
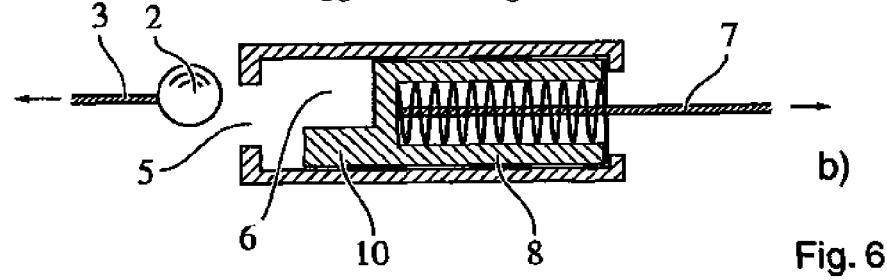

FIG. 6 substantially shows the embodiment according to FIG. 5, in the present part no bearings 20, 22, 23 and no spring 21 being present. As soon as the tensile force between the segments 3, 7 exceeds the spring force of the spring 9, the slider 8 is moved to the right inside the receiver part 6, so that the extension 10 opens up the receiver opening 5. In the present part, the receiver part 6 is mounted in a bearing 34 which, however, does not have to be the case.

Figure 7:
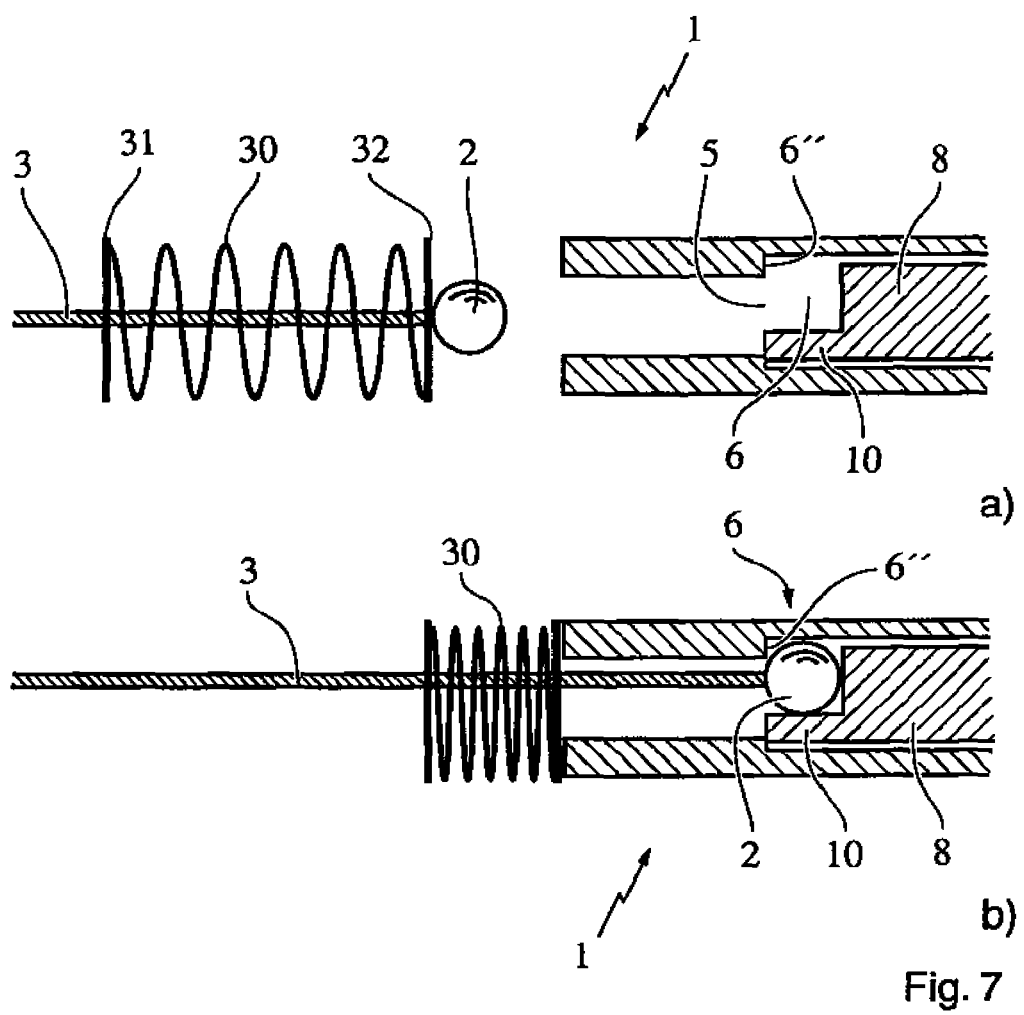
FIGS. 7A, 7B show a further embodiment of the coupling/uncoupling device according to the invention.

FIG. 7 shows a further embodiment of the coupling and/or uncoupling device according to the invention. In the present case, the segment 3 is provided with a spring 30, which is located between two stops 31, 32, the stop 31 being fixedly connected to the segment 3, and the stop 31 being displaceably arranged on the segment 3. For producing the connection, the end fitting 2 is inserted into the receiver opening 5 of the receiver part 6, in this case forced, and thus forces the slider 8 to the right, so that the receiver opening 5 is completely opened up and the end fitting 2 may be received in the receiver part 6. As soon as the end fitting 2 is located in the receiver part 6 (FIG. 7b) the slider 8 snaps back by means of a spring, not shown, which pretensions it in the direction of the receiver opening 5 into its original position (FIG. 7a) and the projection 10 which is arranged on the slider partially blocks the opening 5, so that the end fitting 2 hooks behind the projection 6" and a fixed connection is produced between the segment 3 and the coupling device 1. During the insertion of the end fitting 2 into the receiver part 6, the spring 30 is tensioned so that the end fitting always bears against the projection 6" and does not press against the slider 8 and no noise is generated. The connection between the segment 3 and the coupling and/or uncoupling device 1 is released, by the slider 8 being moved to the right. As a result, the extension 10 opens up the opening 5 completely, and by the pretensioning of the spring 30 the end fitting 2 springs out of the receiver part 6, so that the connection is released.

Figure 8:
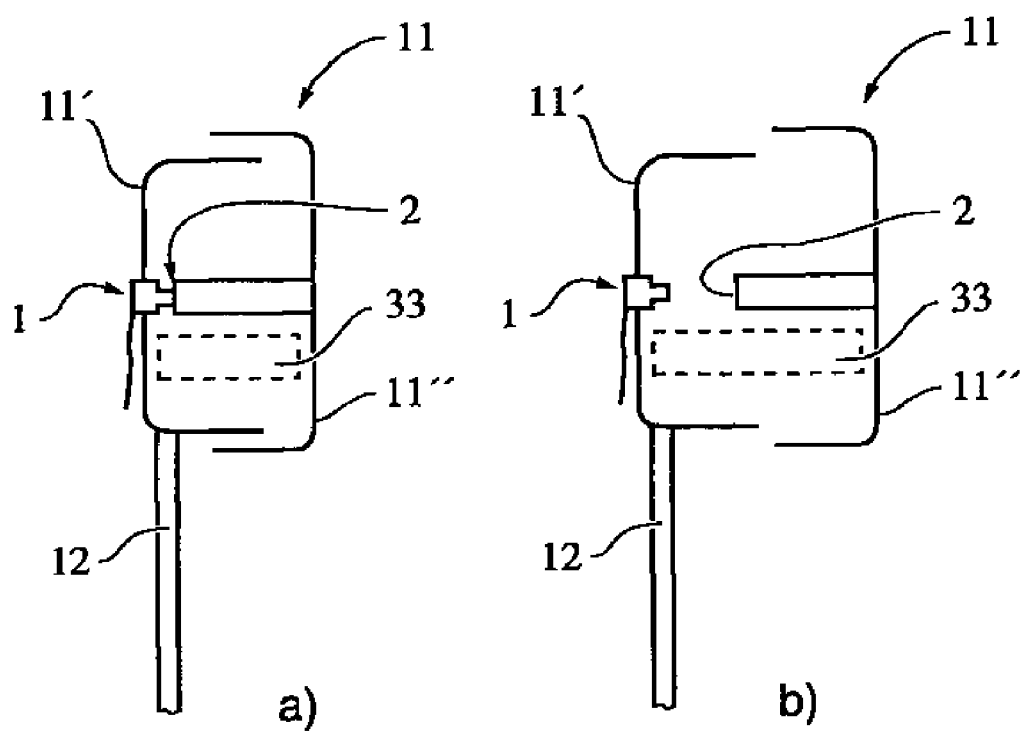
FIGS. 8A, 8B show a headrest with the coupling/uncoupling device according to the invention.

The headrest 1 shown in FIG. 8, consists of a base part 11', which is connected via at least one, preferably two, retaining bars 12 to the backrest of a vehicle seat. On the side facing the seat occupant, the headrest 11 is provided with a padded portion 11", which after releasing a coupling and/or uncoupling device 1, preferably according to the invention, may be displaced from a position of use (FIG. 8a) toward the head of the seat occupant into a safety position (FIG. 8b). To this end, for example, a drive device may be used, which is disclosed in WO 2005/097545 A, in particular in FIGS. 2 to 7.

The coupling device 1 consists of an end fitting 2 which is spherical in the embodiment, which is held in the position of use of the headrest 11 in a receiver part 6, and secures the padded portion 11" in its position relative to the base part 11'. After the displacement of a slider (see to this end the embodiment according to FIG. 9) the padded portion 1" is displaced by the action of the drive device 33, only indicated, relative to the base part 11' in the direction of the head of the passenger. The slider 8 (see FIG. 9) may, for example, be moved in a pyrotechnic or electromagnetic manner or even mechanically by a Bowden cable connection with an actuator arranged in the backrest.

Figure 9:
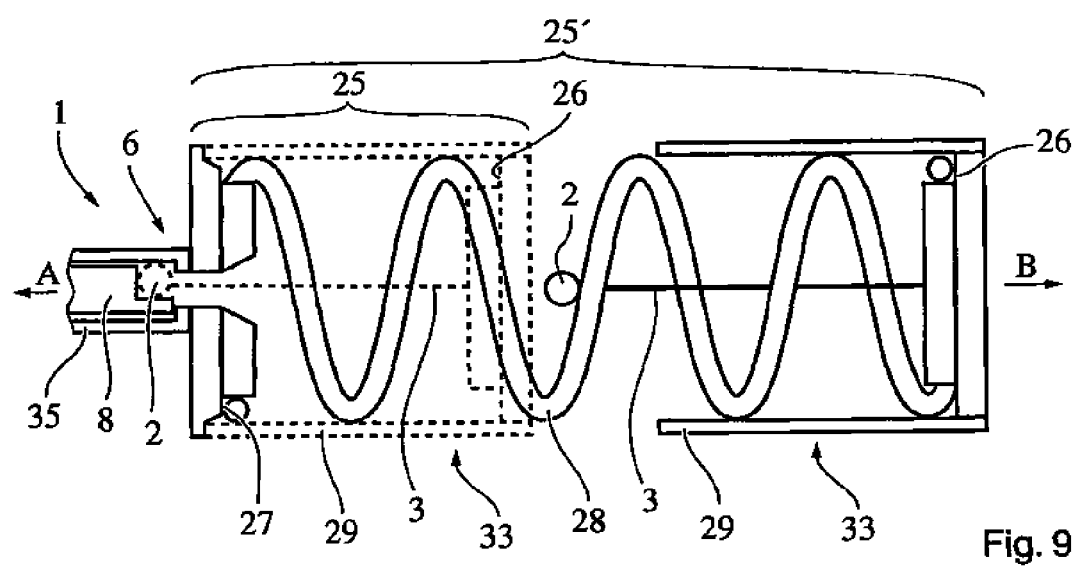
FIG. 9 show an embodiment of the coupling/uncoupling device according to the invention as, for example, may be used in the headrest according to FIG. 8.

In the embodiment according to FIG. 9, the drive device 33 is combined with the coupling device 1 to form a subassembly 25 (position of use, view in dashed lines) and/or 25' (safety position). The end fitting 2 is thus connected via a tension element 3 to a sleeve 29 which is open in the direction of the coupling device 1, in which an energy storage mechanism, for example a compression spring 28, is arranged. The compression spring 28 is thus supported on the axial surface 26 of the sleeve 29 and on a surface 27 of the coupling device 1, opposing said sleeve. When actuating the slider 8 in the direction of the arrow A, the end fitting 2 is released from the receiver part 6 so that the compression spring 28 displaces the sleeve 29 and the padded portion 11" connected thereto toward the head of the seat occupant (arrow B).

Figure 10:
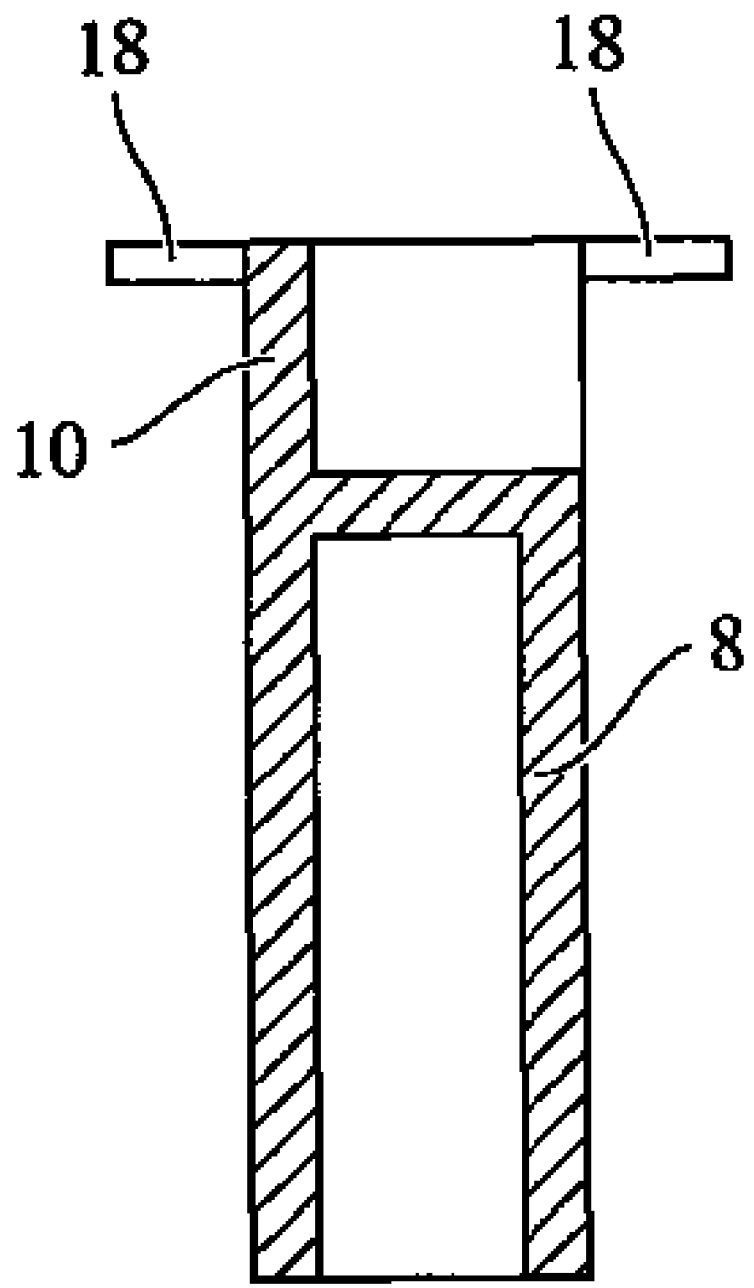
FIG. 10 shows a further embodiment of the slider of the coupling/uncoupling device according to the invention, according to FIG. 1.

FIG. 10 shows a further embodiment of the slider 8, and how it may be inserted in a receiver part according to FIG. 1. The slider is designed in the manner of the slider according to FIG. 1, except that in the present case the slider has at least one, in this case two, projections 18, which run in slots of the receiver part 6.

The invention claimed is:

1. A coupling/uncoupling device for a first segment and a second segment of a transmission means, a connection means, or a combination thereof, comprising a spherical end fitting being arranged on the first segment, and a cylindrical sleeve-shaped receiver for receiving the spherical end fitting along a longitudinal axis of the cylindrical sleeve-shaped receiver, and for capturing the spherical end fitting in a snap-like manner, wherein the cylindrical sleeve-shaped receiver comprises an opening, the size thereof being able to be altered in a reversible manner, and a piston-like slider, which is displaceable within the cylindrical sleeve-shaped receiver along the longitudinal axis, the piston-like slider comprising on its axial surface facing the opening a tab-like extension extending a peripheral surface of the piston-like slider and being capable of reducing the opening, wherein the second segment cooperates with the piston-like slider to enlarge a cross-section of the opening.

2. The coupling/uncoupling device as claimed in claim 1, wherein the piston-like slider is pretensioned in the direction of the opening.

3. The coupling/uncoupling device as claimed in claim 1, wherein the spherical end fitting cooperates with the piston-like slider to enlarge the size of the opening.

4. The coupling/uncoupling device as claimed in claim 3, wherein the size of the opening is reduced after the spherical end fitting is received in the cylindrical sleeve-shaped receiver or is removed therefrom.

5. The coupling/uncoupling device as claimed in claim 1, wherein the transmission means, the connection means, or a combination thereof, has a sheath supported on the cylindrical sleeve-shaped receiver.

6. The coupling/uncoupling device as claimed in claim 1, wherein the coupling/uncoupling device is part of a crash-activatable headrest.

7. The coupling/uncoupling device as claimed in claim 6, wherein the first segment is arranged on a headrest component or on a retaining bar thereof and the cylindrical sleeve-shaped receiver is arranged on a backrest of a motor vehicle seat.

8. The coupling/uncoupling device as claimed in claim 1, comprising means for releasing a connection between the spherical end fitting and the cylindrical sleeve-shaped receiver.

9. A motor vehicle component comprising a coupling/uncoupling device according to claim 1.

10. The vehicle component as claimed in claim 9, wherein the component is part of a motor vehicle seat, a tailgate, an engine cover, or a storage compartment.

11. The vehicle component as claimed in claim 9, wherein the component is configured for fastening transported items or loaded items in motor vehicles.

12. The vehicle component as claimed in claim 9, wherein component comprises a battery pole.

13. The coupling/uncoupling device as claimed in claim 1, wherein the longitudinal position of the piston-like slider is manually adjustable.

14. The coupling/uncoupling device as claimed in claim 1, wherein the longitudinal position of the piston-like slider is adjustable in a motorized manner.

15. A method for connecting two segments of a sheathed cable, wherein the sheathed cable includes an end fitting arranged on a first segment, and a sleeve-shaped receiver part arranged on a second segment, the method comprising inserting the end fitting into an opening in the sleeve-shaped receiver part to drive a piston-like slider longitudinally rearward within the sleeve-shaped receiver part such that a tab-like extension of the piston-like slider moves away from the opening to enlarge the opening, wherein the piston-like slider is driven longitudinally forward after the reception of the end fitting in the receiver part to reduce the opening.

16. The method as claimed in claim 15, wherein the piston-like slider is driven forwardly by a spring.

17. A coupling/uncoupling device, comprising:
an end fitting coupled to a first segment of a cable; and
a receiver part coupled to a second segment of the cable, wherein the receiver part comprises a slider biased toward an opening in the receiver part, a tab extending from an axial surface of the slider toward the opening, and a projection extending from a wall of the receiver part into the opening, wherein the slider is configured to transition between an engaged position in which a distance between the tab and the projection is less than a width of the end fitting, and a disengaged position in which the distance between the tab and the projection is greater than the width of the end fitting, via linear translation of the slider away from the opening.

18. The coupling/uncoupling device of claim 17, wherein contact between the end fitting and the tab drives the slider toward the disengaged position to facilitate insertion of the end fitting within the receiver part.

19. The coupling/uncoupling device of claim 17, wherein the receiver part is configured to capture the end fitting between the tab, the axial surface of the slider, and the wall of the receiver part while the end fitting is within the receiver part and the slider is in the engaged position.

20. The coupling/uncoupling device of claim 17, comprising a spring configured to bias the slider toward the opening.

21. The coupling/uncoupling device of claim 17, wherein the receiver part is substantially sleeve-shaped.

22. The coupling/uncoupling device of claim 17, wherein the end fitting is substantially spherical.

23. The coupling/uncoupling device of claim 17, comprising an extension coupled to the slider, and configured to facilitate movement of the slider toward the disengaged positioned.

* * * * *